(12) United States Patent
Kanellos et al.

(10) Patent No.: US 7,233,959 B2
(45) Date of Patent: Jun. 19, 2007

(54) LIFE-CYCLE MANAGEMENT ENGINE

(75) Inventors: Nick Kanellos, Ottawa (CA); Steve Saunders, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 599 days.

(21) Appl. No.: 10/158,849

(22) Filed: Jun. 3, 2002

(65) Prior Publication Data

US 2003/0236788 A1    Dec. 25, 2003

(51) Int. Cl.
*G06F 17/00* (2006.01)
(52) U.S. Cl. .................................................. 707/104.1
(58) Field of Classification Search ................ 707/100, 707/104.1
See application file for complete search history.

(56) References Cited

U.S. PATENT DOCUMENTS

| | | | |
|---|---|---|---|
| 4,914,586 A | 4/1990 | Swinehart et al. .......... | 364/200 |
| 5,107,419 A | 4/1992 | MacPhail .................... | 395/600 |
| 5,144,556 A | 9/1992 | Wang et al. ................ | 364/419 |
| 5,297,278 A | 3/1994 | Wang et al. ................ | 395/600 |
| 5,325,505 A | 6/1994 | Hoffecker et al. .......... | 395/425 |
| 5,370,423 A | 12/1994 | Guest | |
| 5,379,423 A | 1/1995 | Mutoh et al. ............... | 395/600 |
| 5,475,838 A | 12/1995 | Fehskens et al. ......... | 395/185.1 |
| 5,537,585 A | 7/1996 | Blickenstaff et al. ....... | 395/600 |
| 5,613,108 A | 3/1997 | Morikawa ................... | 393/616 |
| 5,659,743 A | 8/1997 | Adams et al. .............. | 395/621 |
| 5,689,699 A | 11/1997 | Howell et al. .............. | 305/609 |
| 5,745,756 A | 4/1998 | Henley ........................ | 395/620 |
| 5,765,170 A | 6/1998 | Morikawa .................... | 707/200 |
| 5,786,817 A | 7/1998 | Sakano et al. .............. | 345/339 |
| 5,813,009 A | 9/1998 | Johnson et al. ............. | 707/100 |
| 5,813,015 A | 9/1998 | Pascoe ........................ | 707/200 |
| 5,933,840 A | 8/1999 | Menon et al. ............... | 707/206 |
| 5,958,005 A | 9/1999 | Thorne et al. .............. | 709/202 |
| 6,038,541 A | 3/2000 | Tokuda et al. ................. | 705/8 |
| 6,055,612 A | 4/2000 | Spertus et al. .............. | 711/165 |
| 6,065,020 A | 5/2000 | Dussud ....................... | 707/206 |

(Continued)

FOREIGN PATENT DOCUMENTS

CA    2307404    5/2002

OTHER PUBLICATIONS

Donald S. Skupsky, "Applying Records Retention to Electronic Records", The Infromation Management Journal, Jul. 1999, pp. 28, 30-35.*

(Continued)

*Primary Examiner*—Uyen Le
(74) *Attorney, Agent, or Firm*—Konrad Raynes & Victor LLP; David W. Victor

(57) ABSTRACT

A records manager manages life cycle phases of records managed by a host application program. The records manager is in communication with the host application program over a network and includes a file plan database, a record management engine and an application program interface. The file plan database includes at least one file plan object, with each file plan object having a life cycle rule. The record management engine is configured to manage life cycle states of the record. The application program interface is in communication with the record management engine and is configured to transmit to the host application program over the network indications of changes in the life cycle phases.

54 Claims, 4 Drawing Sheets

U.S. PATENT DOCUMENTS

| | | | |
|---|---|---|---|
| 6,088,720 A | 7/2000 | Berkowitz et al. | 709/206 |
| 6,098,074 A | 8/2000 | Cannon et al. | 707/200 |
| 6,108,670 A | 8/2000 | Weida et al. | 707/203 |
| 6,148,312 A | 11/2000 | Paik et al. | 707/530 |
| 6,157,929 A | 12/2000 | Zamiska et al. | 707/200 |
| 6,185,576 B1 | 2/2001 | McIntosh | 707/200 |
| 6,721,782 B1 * | 4/2004 | Fariborz et al. | 709/204 |

OTHER PUBLICATIONS

Apte et al, "Automated Learning of Decision Rules for Text Categorization", ACM Transactions on Information Systems, vol. 12, No. 3, Jul. 1994, pp. 223-251.*

Tarian Software, Inc., "Tarian eRecordsEngine v. 1.0 with Microsoft SharePoint Portal Server 2001", Mar. 11, 2002, 5 pp.

* cited by examiner

LIFE-CYCLE MANAGEMENT ENGINE

FIELD OF THE INVENTION

The present invention relates to a system for managing electronic records. In particular, the present invention relates to an engine for managing the retention and disposal of electronic records.

BACKGROUND OF THE INVENTION

The conventional records management system consists of a database having entries each associated with a respective electronic record. Typically, each entry includes fields which identify the title, author, publication date, subject matter, status and location of the associated record. In addition, each entry may also include a record retention data field which identifies the time period after which the record should be archived to storage, and the time period after which the archived record should be destroyed.

Typically, record management systems have been used to manage libraries of paper or otherwise tangible documents. However, given the proliferation of electronic documents, such as word processing documents, spreadsheet documents, drawing documents and e-mail, attempts have been made to provide software solutions for managing electronic records, including their retention and disposal.

For instance, in 1993 Mutoh (U.S. Pat. No. 5,379,423) described a computer-based information life cycle management system including an information management program, terminals from which a user may issue a processing request, data processing storage spaces for storing information objects having a particular life cycle state, and storage devices which store information associated with the information objects. Stored information includes the owner of each information object, the users allowed to use each information object, the parent/child information object hierarchy for each information object, and the life cycle data for each information object (such as the life cycle states, the conditions or timing for transforming an object between states, and the life cycle state sequence). Disclosed life cycle states include an approved state (where the contents of the object have been approved, but use of the object contents has not yet been allowed), an open state (where use of the object contents is allowed), a seal state (where use of the object contents by anyone other than the owner is prohibited) and an abort state (where the object is deleted).

Upon receipt of a processing request from a terminal, such as a request to define an object, the information management program presents the user with an object list which allows the user to specify the information for the object to be generated, such as the information object hierarchy, the life cycle information, the users and their access privileges. Subsequently, if the information management program receives an access request or a state transform request, the information management program performs the requested operation if the operation is in accordance with the owner/user information and the life cycle information. If the information management program performs a state transform on the information object in response to a state transform request from a terminal, the information management program also performs any necessary life cycle transforms on child information objects or parent information objects, as determined by the parent/child hierarchy for the object, and moves each information object to the storage space associated with its new life cycle state. If the information object has been transformed to the abort state, the information management program also deletes the information object.

In 1995, Johnson (U.S. Pat. No. 5,813,009) described a computer-based information location management system which includes a data filter for processing incoming electronic records, one or more permanent storage devices (eg. a WORM platter) for storage of the records, a database which contains information associated with the records, and a records manager interface. The patentee described a hierarchical filing structure for the records, which included a "cabinet" representing a physical storage location, a "case type" representing a type of the file (eg. contract), a "case" representing a specific instance of the parent case type, a "folder" which represents a logical filing unit within a "case", and a "document" which represents individual documents within a "folder".

The data filter is configured to receive electronic records, including scanned images, word processing files, and voice data. Upon receipt of an electronic record, the data filter verifies that the record header includes the appropriate filing and index data (eg. physical storage location, data/time, retention data). The data filter then attaches a tag which the database uses to track the storage location, and retention data associated with the record. The received record is then "certified", either automatically or via operator intervention, by storing the record in one of the "permanent" storage devices and updating the database with the retention data and the location of the record within the filing structure. In order to facilitate the subsequent deletion of records from the permanent storage, records having similar retention periods are stored on the same physical storage device.

Periodically, a records manager can use the interface to query the database for a list of all records having a date of destruction predating the query date. The records manager can then change the retention data for any of the listed records, and delete any or all of the listed records from the permanent storage. If any of the records are stored offsite, the records manager issues a command to the offsite storage requesting that the specified electronic record(s) be deleted. Upon receipt of confirmation that the specified records have been deleted, the records manager updates the database to reflect the deletion.

Although Mutoh and Johnson describe complete solutions for managing electronic records from inception to deletion, the records must be copied out of the environment in which they were created. Mutoh discloses that this step is necessary to provide efficient data processing of the records, whereas Johnson discloses that this step is necessary to allow a court to assess the knowledge and skill of the individual who stored the records, and thereby rule upon the admissibility of the stored records. As a consequence, both Mutoh and Johnson must implement an access protocol and a corresponding user interface to prevent unauthorized access to the stored records. Since the software environment used to create the records will typically have its own access protocol and its own user interface, these solutions unnecessarily increase the computing resources required.

Further, although Johnson discloses that records can be automatically certified for use by the information management program, automatic certification requires that the records arrive at the data filter already carrying the appropriate filing and index data. Since Johnson discloses that the records are stored in a hierarchical filing structure, users must become familiar with the operation of the information management program to at least supply the requisite filing data. This requirement impedes the adoption of the information management program, particular by users reluctant to learn multiple user interfaces.

Therefore, there remains a long-felt need for a satisfactory management system for managing electronic records.

SUMMARY OF THE INVENTION

According to a first aspect of the present invention, there is provided a method for managing electronic records, which involves the steps of (1) receiving over a network a record identifier uniquely associated with a record managed by an application program, the record management engine being configured to manage life cycle states of the record, the record identifier including profile data for the associated record; (2) filing the received record identifier within a file plan node of a file plan in accordance with the associated profile data, each said file plan node having an associated retention rule; (3) determining life cycle states for the managed records from the retention rules; and (4) transmitting life cycle instructions over the network requesting the application program transition the managed records to the respective life cycle states.

There is also provided a computer-readable medium carrying processing instructions for a computer which, when loaded into the computer, cause the computer to perform the above-noted sequence of steps.

According to a second aspect of the present invention, there is provided a computer-based electronic record management engine for facilitating life cycle management of records managed by an application program. The record management engine includes receiving means, filing means, determining means and providing means. The receiving means is configured to receive a record identifier associated with a record managed by the application program, with the record identifier including profile data for the associated record. The filing means is configured to file the received record identifier within a file plan node of a file plan in accordance with the associated profile data, with each file plan node having an associated life cycle rule. The determining means is configured to determine life cycle states for the managed records from the life cycle rules. The providing means is configured to provide life cycle instructions requesting the application program transition the managed records to the respective life cycle states.

There is also provided a computer-readable medium carrying processing instructions for a computer which, when loaded into the computer define in the computer the aforementioned receiving means, filing means, determining means and providing means.

According to a third aspect of the present invention, there is provided a records manager for managing life cycle phases of record managed by an application program. The record manager is in communication with the host application program over a network, and includes a file plan database, a records management engine and an application program interface. The file plan database includes at least one file plan node, with each file plan node having a life cycle rule. The record management engine includes filing means and determining means. The filing means files record identifiers within the file plan objects in accordance with record profile data received over the network. The determining means is configured to track changes in the life cycle phases for the records from the life cycle rules. The application program interface is in communication with the record management engine, and is configured to transmit to the host application program over the network indications of the changes in the life cycle phases.

According to a fourth aspect of the present invention, there is provided a computer-based electronic records management engine for facilitating life cycle management of records managed by an application program. The records management engine is in communication with the host application program over a network, and includes a database interface, filing means in communication with the database interface, determining means in communication with the database interface, and an applications program interface in communication with the filing means and the determining means. The database interface is used to access a file plan database having at least one file plan node, with each file plan node including a life cycle retention rule governing life cycle phase changes of an object associated with the file plan node. The filing means files record identifiers within respective file plan nodes in accordance with respective profiles for the records, with the profiles being received over the network. The determining means tracks changes in the life cycle phases for the records from the life cycle rules. The applications program interface is configured to transmit to the host application program over the network indications of the changes in the life cycle phases.

There is also provided a computer-readable medium carrying processing instructions for a computer which, when loaded into the computer define in the computer the aforementioned database interface, filing means, determining means, and applications program interface.

According to a fifth aspect of the present invention, there is provided a computer-based management engine for managing life cycle phases of electronic records managed by a host application program. The management engine is configured to communicate with the host application program over a network and includes an interface for accessing a file plan database, and filing means and determining means both in communication with the interface. The interface is used to access a file plan database having at least one file plan node, with each file plan node including a life cycle retention rule governing life cycle phase changes of an object associated with the file plan node. The filing means files record identifiers within respective file plan nodes in accordance with respective record profiles received over the network from the application program. The determining means transitions the managed records between the different life cycle phases from the respective life cycle rules.

There is also provided a computer-readable medium carrying processing instructions for a computer which, when loaded into the computer define in the computer the aforementioned database interface, filing means, determining means, and applications program interface.

According to a sixth aspect of the present invention, there is provided a computer-based electronic records management engine for facilitating life cycle management of records managed by an application program. The records management engine is in communication with the host application program over a network, and includes a database interface, defining means in communication with the database interface, filing means in communication with the database interface, determining means in communication with the database interface, and an applications program interface in communication with the defining means, filing means and the determining means. The database interface is used to access a file plan database having at least one file plan node, with each file plan node including a life cycle retention rule governing life cycle phase changes of an object associated with the file plan node. The defining means defines a file plan including at least one file plan node, including a parent child node, a file plan object class, at least one file plan attribute and a life cycle retention rule. The filing means files record identifiers within respective file plan nodes in accordance with respective profiles for the records, with the profiles being received over the network. The determining means tracks changes in the life cycle phases for the records from the life cycle rules. The applications program interface is configured to transmit to the host application program over the network indications of the changes in the life cycle phases.

There is also provided a computer-readable medium carrying processing instructions for a computer which, when loaded into the computer define in the computer the aforementioned database interface, filing means, determining means, and applications program interface.

BRIEF DESCRIPTION OF THE DRAWINGS

The present invention will now be described, by way of example only, with reference to the accompanying drawings, in which.

DETAILED DESCRIPTION OF THE PREFERRED EMBODIMENT

Figure 1:
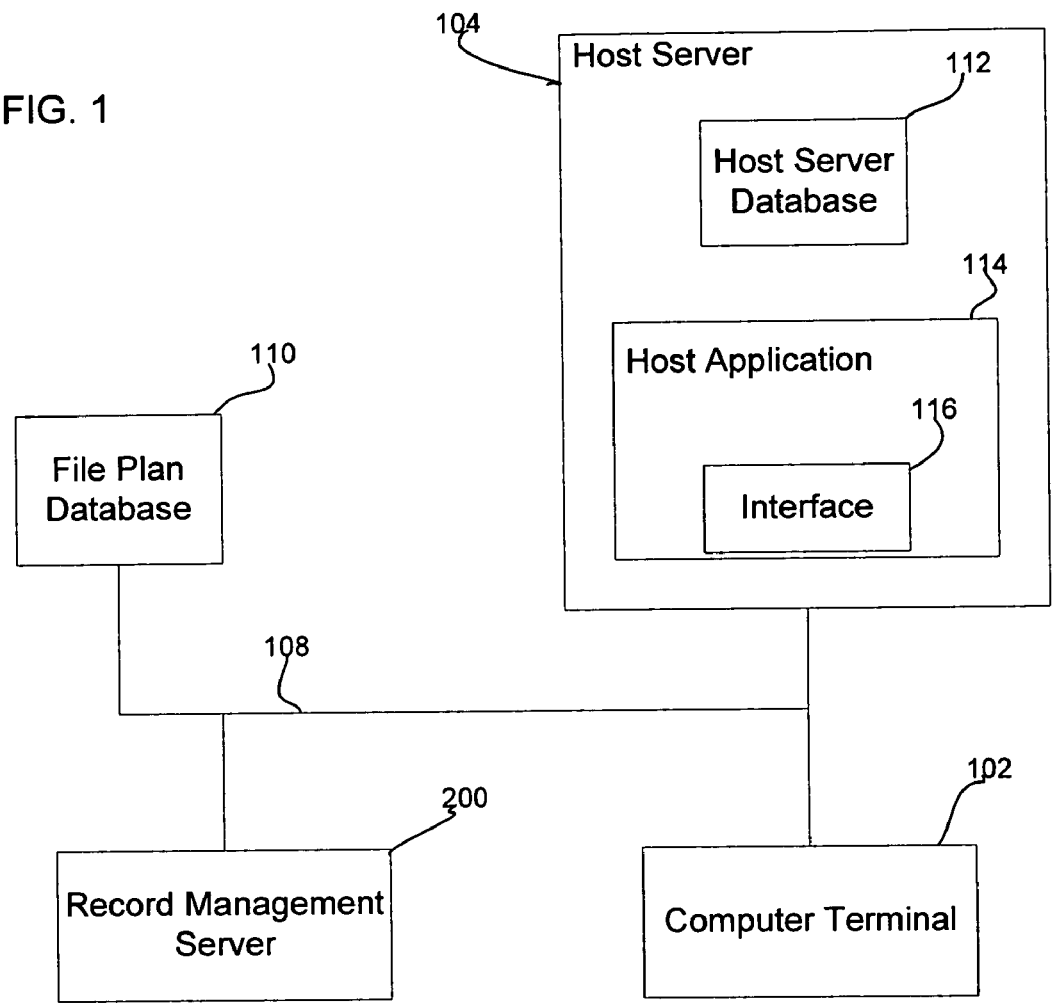
FIG. 1 is a schematic view of the record management system, depicting the computer terminals, the host computer server, and the record management server.

Turning now to FIG. 1, an electronic record management system, denoted generally as 100, is shown comprising at least one computer terminal 102, a host computer server 104, a record management server 200 for managing the life cycle of records managed by the host computer server 104, and a communications network 108. The communications network 108 preferably comprises a network which facilitates communication between the computer terminals 102 and the host server 104, between the computer terminals 102 and the record management server 200, and between the host server 104 and the record management server 200. Alternately, however, the functions of the host server 104 and the record management server 200 may be implemented on a common computer server with the communications network 108 merely facilitating communication between the computer terminals 102 and the computer server. Further, the communications network 108 may be omitted altogether, with the functions of the computer terminals 102, the host server 104 and the record management server 200 being implemented on a single computer.

The record management system 100 also includes a file plan database 110 accessible by the record management server 200. Typically, the record management server 200 accesses the file plan database 110 over the communications network 108, however for enhanced security the file plan database 110 may be provided on the same computer server as the record management server 200.

The host server 104 includes a secure database 112 of computer records, however the records database 112 may also be provided on a separate secure file server accessible by the host server 104. Typically, the computer records comprise word processing documents, spreadsheet documents, desktop publishing documents, and multimedia files, however the computer records can also comprise executable computer code, databases or any electronic data accessible by a computer terminal 102. Preferably, the database 112 also includes for each record one or more profile data items such as the title, author, publication date, and subject matter of the record.

The host server 104 is configured with a computer application program 114 which is communication with the host server database 112, and provides users of the computer terminals 102 with access to the computer records of the host server database 112. For expandability purposes, preferably the host application program 114 is a web-based or n-tier distributed application, and each computer terminal 102 is configured with application software, such as web browser, which provides users of the computer terminals 102 with a stateless interface with the host server 104.

Typically, the host application program 114 maintains a database of user accounts (including usernames and passwords), and group definitions which provide the computer terminal users with controlled access to the computer records. The record management server 200 uses the user and group account information maintained by the host application program 114 to provide users of the computer terminals 102 with controlled access to the record management server 200 (via the host application program 114). However, in one variation, the host application program 114 does not maintain individual user or group accounts, and the host application program 114 accesses the record management server 200 via a "guest" account, in which case the record management server 200 will not be able to impose restrictions to the record management server 200 on a user-by-user basis.

Preferably, the record management server 200 communicates with the host application program 114 using COM or Simple Object Access Protocol (SOAP) components. Consequently, preferably the host application program 114 includes an interface 116 which is capable of interacting with COM objects or SOAP-compliant objects. Additionally, preferably the record management server 200 is a Windows 2000-based server, in which case the host application program 114 should be operable in a Windows 2000 Server environment.

The host application program 114 implements the following function calls:

Accession:

The record management server 200 calls this function when the life cycle of a record managed by the host server 104 has been exhausted, and it is time to transfer the record to an external authority for permanent archival. In response, the host application program 114 copies the record to a record management server transfer directory specified in the function call. To ensure that there are no collisions in the transfer directory, the host application program 114 stores the record in the transfer directory with a name of: HostId-.HostRecordId.ext, where HostId is the unique HostID of the host application program 114, HostRecordId is the unique id of the item within the host server 104, and ext is the native extension of the host record (eg. doc, eml, xml, etc.).

After the host record is copied to the transfer directory, the host application program 114 deletes the record from the host server 104. The host application program 114 then provides the record management server 200 with an XML data structure which specifies the complete path to the record in the transfer directory, and the profile data items which the host application program 114 originally associated with the record in the host server database 112.

Delete:

The record management server 200 calls this function to notify the host application program 114 that the record management server 200 will no longer track the life cycle states of the record specified in the function call. In response, preferably the host application 114 deletes the record from the host server database 112, although the host application 114 may elect to not do so.

Destroy:

The record management server 200 calls this function when the life cycle of a record managed by the host server 104 has been exhausted, and it is time to permanently delete the record from the host server database 112. In response, preferably the host application program 114 deletes the record from the host server 104, although the host application 114 may elect to not do so. The host application program 114 then provides the record management server 200 with an XML data structure which specifies the complete path to the record in the host server database 112, and the profile data items which the host application program 114 originally associated with the record in the host server database 112.

GroupList:

The record management server 200 calls this function in order to obtain an XML list of user groups used by the host application 114. The record management server 200 uses this information to establish group security access in the record management server 200.

UserList:

The record management server 200 calls this function in order to obtain an XML list of users authorized to use the host application program 114. The record management server 200 uses this information to establish user security access in the record management server 200.

TransitionToPhase:

The record management server 200 calls this function to notify the host application program 114 that the record specified in the function call has been transitioned from one life cycle phase to another life cycle phase. This function may optionally specify that the host application program 114 should copy the specified record to a directory specified in the function call.

UnRegister:

The record management server 200 call this function when a user deletes a file plan object 122 from the file plan, and specifies that the host application program 114 should no longer consider that the life cycle of the associated record is managed by the record management server 200.

The file plan database 110 is implemented as a SQL database, and contains records which define the file plan for the record management system 100. The file plan is a hierarchical arrangement of nodes which are used to categorize the electronic records managed by the host application program 114 into an arrangement which reflects any desired criteria. An administrator may create or implement a file plan by specifying, for each file plan node 120, the parent child node 120, the file plan object class, and the file plan attributes 124, the life cycle code 126, and the suspension status 128. For instance, the nodes might be arranged in a subject matter-based hierarchy (eg. subject matter, author, title), or even a location-based hierarchy (eg. warehouse, aisle, filing cabinet) to reflect the physical location of the corresponding physical records.

There are four steps to defining a file plan in the file plan database 110. They are (1) defining the "views" of the file plan, (2) the components or file plan objects 122 that comprise the file plan, (2) the relationship between these components and (4) the rules that govern how the related components interact.

The file plan view describes the manner in which the information is organized. It is a collection of relationships between the components that comprise the file plan. For example, the US Army Marks file plan consists of four types of components—Record Series, Record Categories, Folders and Records; each defining consecutively narrower classes of information. There is a single hierarchical thread that starts at the Record Series and ends at Folder. This same information may be organized in an alternate manner or view. For example, it may be organized according to the physical location of the records—Building, Floor, Aisle, Shelf and Folder. The records in the above two examples are stored in a hierarchical file plan; i.e., the file plan components or file plan objects 122 were related to each other in a parent-child relationship. The engine supports multiple hierarchical and non-hierarchical views, which may be overlapping or discrete with respect to file plan components contained within.

The components of the file plan define the classes of information stored within the file plan. Each file plan contains at least one component. There are no limits to the number of components that the creator of the file plan may define. The components that comprise the file plan define classes of information. Each component in the file plan has a different name, properties and behaviours. A user may specify the file plan component definitions that comprise the file plan. The file plan component definitions have a set of properties that determine the behaviour of the file plan components. These properties include the name and primary view. The name is a unique identifier that differentiates file plan components of a specific type from other of a different type. Examples of file plan component definition names include Record Series, Record Categories, Folders and Records. The primary view is the file plan view that any file plan component must exist within.

The different types of file plan components have different sets of file plan attributes 124 that are used to provide additional information about the file plan components. For example, if a file plan includes a file plan object 122 called "Folder", then there can be an unlimited number of folder in a plan, but all folders will share a common set of file plan attributes 124. The values stored within each folder may differ, but the attributes themselves will exist in all folders in the file plan. The attributes for the file plan component "folder" may include folder unique identifier, location, etc. Each file plan attribute definition in turn has a set of properties that govern its behaviour. For example, an attribute must be of a particular data type (integer, real number, date, currency, etc.). The user may also limit the size or amount of data stored in a given attribute definition.

The relationships that can exist between different types of file plan components are declarations that any two file plan components can be related to each other in a specific way. A relationship definition consists of three properties; the type of file plan component or file plan object 122 at one end of the relationship (source), the type of file plan component or file plan object 122 at the other end of the relationship (target) and the file plan view to which the relationship belongs. For example, if the file plan is hierarchical, the relationship between the file plan components can be characterized as parent-child.

Figure 2:
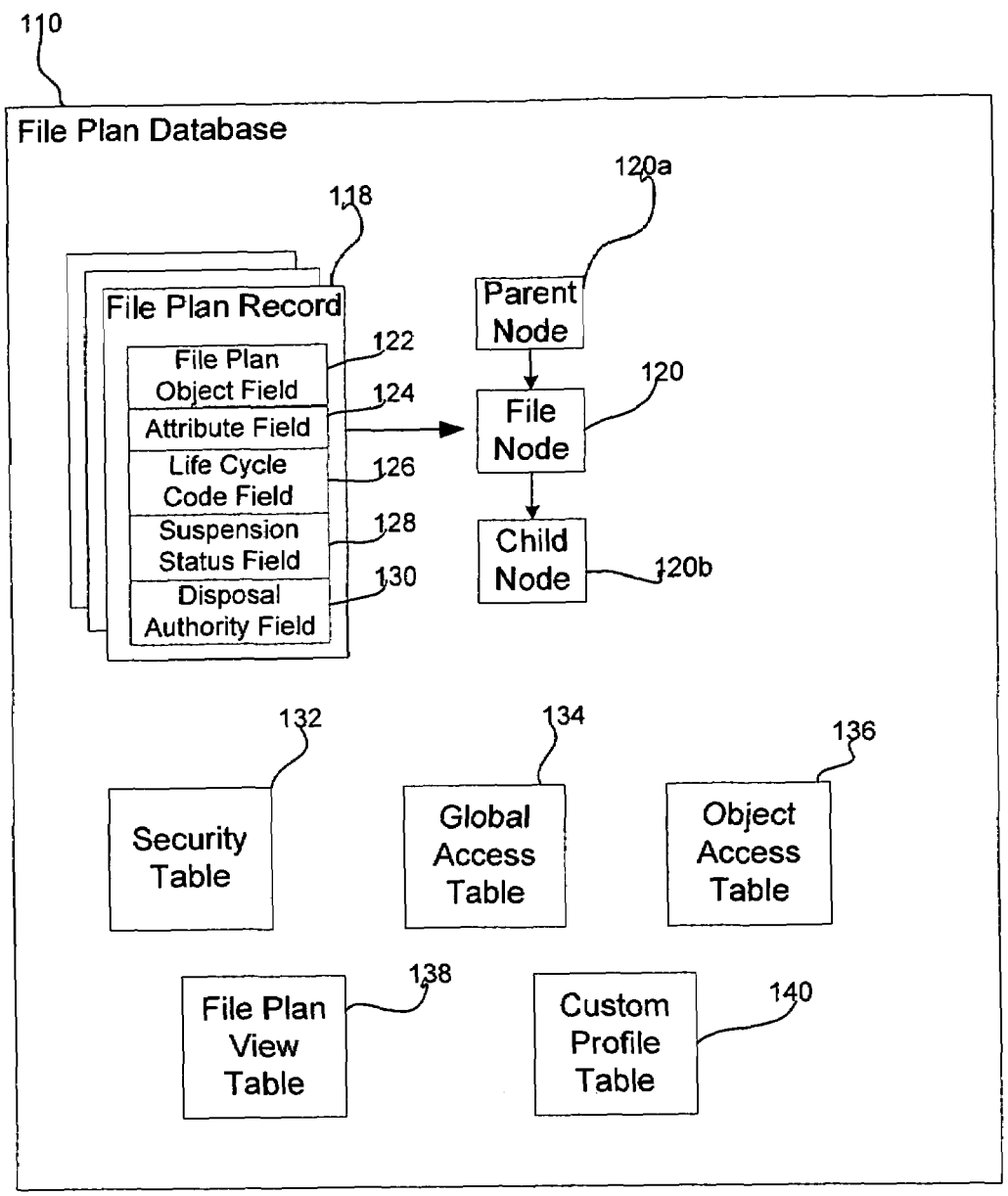
FIG. 2 is a diagram depicting the structure of the file plan database.

The structure of the file plan database 110 is depicted in FIG. 2. As shown, the file plan database 110 comprises a number of file plan records 118, each associated with a file plan node, and identifying a parent node 120*a* and a child node 120*b* to the file plan node. Also, each file plan record 118 includes a file plan object field 122, and an attribute field 124, a life cycle code field 126, a suspension status field 128 and a disposal authority field 130 for each file plan object field 122.

The file plan object field 122 can characterize the corresponding node 120 as a "file" object, a "folder" object or a "record" object. Consistent with the hierarchical nature of the file plan, a file object can include file objects, folder objects and record objects. A folder object can include a number of related record objects. Record objects stored within a folder object might be related, for instance, by subject matter and/or authorship. A record object holds an identifier uniquely associated with a host record managed by the host application program 114. Consequently, a record object can have an identifier uniquely associated with a word processing record, a spreadsheet record, a desktop publishing record, a multimedia file, an executable computer program, a database or any other electronic data managed by the host application program 114.

The attribute field 124 specifies one or more profile data items for each object, such as "author", "subject matter" and "project code". Preferably, when the administrator of the record management server 200 defines attributes 124 for the file plan, the administrator also predefines values for the attributes 124 and defines "pick-lists" which allow users to select from the predefined values for an attribute 124 when the user registers (discussed below) a host record with the record management system 100. The administrator can associate a pick-list with one or more users by defining "custom profiles" (described below). Thus, for example, if a file plan object attribute 124 identified a department project code, the administrator could populate a pick-list with all the valid project codes, and then associate the pick-list with the appropriate node 120 in the file plan. When a user attempts to insert a new host record into the file plan, the record management server 200 will present the user with the valid project codes for selection.

The life cycle code field 126 is a mandatory field which identifies the life cycle phase for the associated file plan object 122. To allow the record management server 200 to implement life cycle management, the administrator of the record management server 200 identifies the various life cycle phases for the file plan objects 122 (eg. cutoff, accession or destroy) and the sequence through which each record registered with the record management server 200 will pass. The administrator then assigns a life cycle code (LCC) 126 for each life cycle phase, and defines retention rules which define the parameters governing the transitioning of file plan objects 122 between the life cycle phases. When a user registers a record with the record management server 200, the user must insert in the life cycle code field 126 one of the defined life cycle codes 126.

The life cycle code field 126 includes a name sub-field, disposition type sub-field, and phase sub-field. The name sub-field include an identifier which uniquely identifies the life cycle code 126. The disposition type field specifies the activity to be performed by the host application program 114 when the associated file plan object 122 reaches the end of the retention period. For instance, the disposition type field may specify that the file plan object 122 should be destroyed or transferred to an external depository at the end of the retention period.

The phase sub-field specifies the period of time that a file plan object 122 spends in each in life cycle state, and the security level (described below) that the object receives when it enters each life cycle state. The phase sub-field also includes cutoff information for the file plan object 122. Typically, when a file plan object 122 enters a cutoff phase, access to the file plan object 122 is restricted. For instance, if the file plan object 122 is a file object, the record management server 200 might be configured to prevent users from adding record objects to the file plan object 122 while the file plan object 122 remains in the cutoff phase.

The cutoff information includes a cutoff flag which indicates whether the file plan object 122 has entered a cutoff phase, a cutoff cycle date which identifies the start date of a cutoff phase, and a cutoff frequency which specifies the frequency in which cutoff is applied during the course of a year. If a file plan object 122 enters a cutoff phase, the retention period for that object does not begin until the next cutoff period begins, thereby lengthening the object's effective retention period.

For example, if the cutoff cycle date for a file plan object 122 is January $1^{st}$, and the cutoff frequency is semi-annually, a cutoff determination will be made as of January $1^{st}$ and July $1^{st}$ each year. If the file plan object 122 is registered with the record management server 200 on December $14^{st}$ (its life cycle date), and is assigned a retention rule defining the sequence of a cutoff phase, a one year active retention phase, and a two year dormant retention phase; and if the current life cycle phase specified in the life cycle code 126 is the cutoff phase, then any field plan object 122 having this life cycle code 126 will be in the cutoff phase until January $1^{st}$. Thereafter, the host record associated with the field plan object 122 will have a life span of three years from the date that the field plan object 122 completed the cutoff phase (not three years from the December $14^{th}$ date), after which the host record will either be deleted from the host server (if the life cycle code 126 has a disposition type of delete) or transferred to the disposal authority 130 specified for the file plan object 122 (if the life cycle code 126 has a disposition type of accession).

The record management server 200 uses the suspension status field 128 to determine whether a file plan object 122 can be transitioned to the next life cycle phase. The suspension status field 128 includes a suspension name, and the name of the user who suspended the object. If a object is suspended, the object 122 is frozen in its current life cycle phase, thereby preventing the object 122 from being transitioned to its next life cycle phase and the corresponding host record from being disposed of until the suspension is removed. A object 122 can have multiple suspensions at any given time, in which case the corresponding host record cannot be disposed of until all the suspensions are lifted.

As shown in FIG. 2, in addition to the file plan records 118, the file plan database 110 includes a security table 132, a global access table 134, a object access table 136, and a file plan view table 138, and may also include a custom profile table 140. The record management server 200 uses the security table 132 to limit access to the record management server 200 to identified users, and to control the functions that users are authorized to perform while logged in to the record management server 200.

The security table 132 includes authentication data for host servers 104, and authentication and function authorization data for local and host accounts. The host server authentication data consists of a HostID file, a Host/Alias file and an Alias/DSN file. The HostID file includes entries each identifying a Host ID, a Host Name and a Host Password. The Host ID is a number assigned by the record management server 200 which uniquely identifies the host server 104. The Host Name is a unique descriptive name for the host server 104 which indicates where a file plan record 118 originated. The Host Password is an encrypted entry which the host server 104 must supply the record management server 200 in order to access the record server on behalf of a host user.

The Host/Alias file is an XML file which includes entries each identifying a Host Name and a Host Alias. The record management server 200 uses the Host/Alias file to map the host name to a database alias. The Alias/DSN file is an XML file which includes entries each identifying a Host Alias, a Database Connection string, and a Database Password. The Database Connection string includes ADO information required by the record management server 200 to address the correct file plan database 110 for the host server 104. The Database Password is an encrypted entry which is used to access the file plan database 110.

Local accounts are reserved typically for administrative users, and are accessed by logging into the record management server 200 directly from one of the computer terminals 102. Since local users are unknown to the record management server 200 until they log in to the server, the authentication data of each local account security table record includes both a UserID entry and a corresponding Password entry for authenticating each local user. On the other hand, host accounts are reserved for non-administrative users, and are accessible only through the host application program 114. Since host users are already logged into the host server 104, the authentication data of each host account security table record includes only a UserID entry and does not contain a password entry.

The record management server 200 uses the function authorization data for the local and host accounts to specify the functions each user is authorized to perform with the record management server 200. Typical function rights include report generation, disposal authority specification, file plan design, life cycle design, pick list management, profile design, and security management.

In addition to the authentication and function authorization data for local and host accounts, the security table 132 also includes records containing authentication and function authorization data for both local groups and host groups. The record management server 200 uses the group authentication and function authorization data to recognize classes of users and to assign authorized functions to all members of the class.

The administrator of the record management server 200 must explicitly create the local groups. In contrast, when a host user requests access to the record management server 200, the host application program 114 provides the record management server 200 with the HostID, the Host Password, the UserID of the user logged into the host server 104, and a list of all groups to which the host user belongs. The record management server 200 compares the HostID and Host Password against the corresponding entry in the HostID file to verify that the host server 104 is authorized to log into the record management server 200. The record management server 200 then determines the Host Alias for the host server 104 from the Host/Alias file, determines the Database Connection string from the Alias/DSN file, and then logs into the file plan database 110 using the associated Database Password. Once the host application program 114 successfully logs into the file plan database 110, the record management server 200 stores the group list in the security table 132 and updates the group list with the identified members as each host user logs into the file plan database 110.

The global access table 134 includes records containing access data for all the object types implemented in the file plan. The record management server 200 uses the global access table 134 data to globally control the operations each user and/or group is permitted to perform with respect to each file plan object class (eg. file, folder, record). Each access table 134 record is linked to a record of the security table 132, and identifies for each user and/or group the file plan object operations the user or group is permitted to perform. Typical file plan object operations include add, delete, and change permission.

The object access table 136 includes records containing access data for individual objects of the file plan. The record management server 200 uses the object access table 136 data to control the operations each user and/or group is permitted to perform with respect to each file plan object 122, and thereby override the global permissions set in the global access table 134. Each object access table 136 record is linked to a respective file plan record 118, and identifies for each file plan object 122 the operations each user or group is permitted to perform on that object. Consistent with the hierarchical nature of the file plan, permissions applied to a file plan object 122 are also applied to all descendants of the file plan object 122.

The file plan view table 138 lists a subset of the file plan objects 122, and identifies the relationship between the file plan objects 122 of the subset of file plan objects. The identified relationship can be hierarchical, binary or unary. In a hierarchical view, if the attribute value for a file plan object 122 has not been specified, the file plan object 122 inherits the attribute value from the parent object of the file plan object 122 (or the parent object of the parent object, if the attribute value for the parent object has also not been specified). Inheritable attributes 124 include life cycle code 126, suspension status 128, disposal authority 130 and security.

Unary and binary views respectively define unidirectional and bi-directional relationships between all file plan objects 122 in the view. No attributes 124 are inherited in a unary or binary view. These latter two view types define non-hierarchical relationships between the objects in the file plan, such as a "cross-reference" relationship or a "classification" relationship.

The record management server 200 uses the file plan view table 138 to provide users with different mechanisms for viewing the objects and the attributes 124 of the file plan. For example, the administrator of the record management server 200 might define for the users of the computer terminals 102 an "alphanumeric" logical view and a "warehouse" physical view. In the "alphanumeric" view, the record management server 200 would depict file objects, folder objects and record objects. In the "warehouse" view, the record management server 200 would depict warehouse objects, aisle objects, shelf objects, box objects and folder objects.

The custom profile table 140 defines a subset of the attributes 124 for at least one of the file plan objects 122, and lists users allowed to view the attribute subset. In addition, the custom profile table 140 specifies, for each attribute 124, whether the attribute 124 is read-only, whether the attribute 124 is mandatory, and also identifies any default value or pick-list assigned to the attribute 124. The record management server 200 uses the custom profile table 140 to control the manner in which users are allowed to enter data for any object of the file plan. For instance, if the file plan includes a file plan object 122 having an attribute "project status" to which only managers should be allowed access, the administrator of the record management server 200 could define a "generic" profile that excludes the "project status" attribute, and a "manager" profile that contains the "project status" attribute, and then assign users access to one or the other profile. As a result, whenever the file plan object 122 is viewed, the appropriate attributes 124 would be displayed in accordance with their respective management status.

Figure 3:
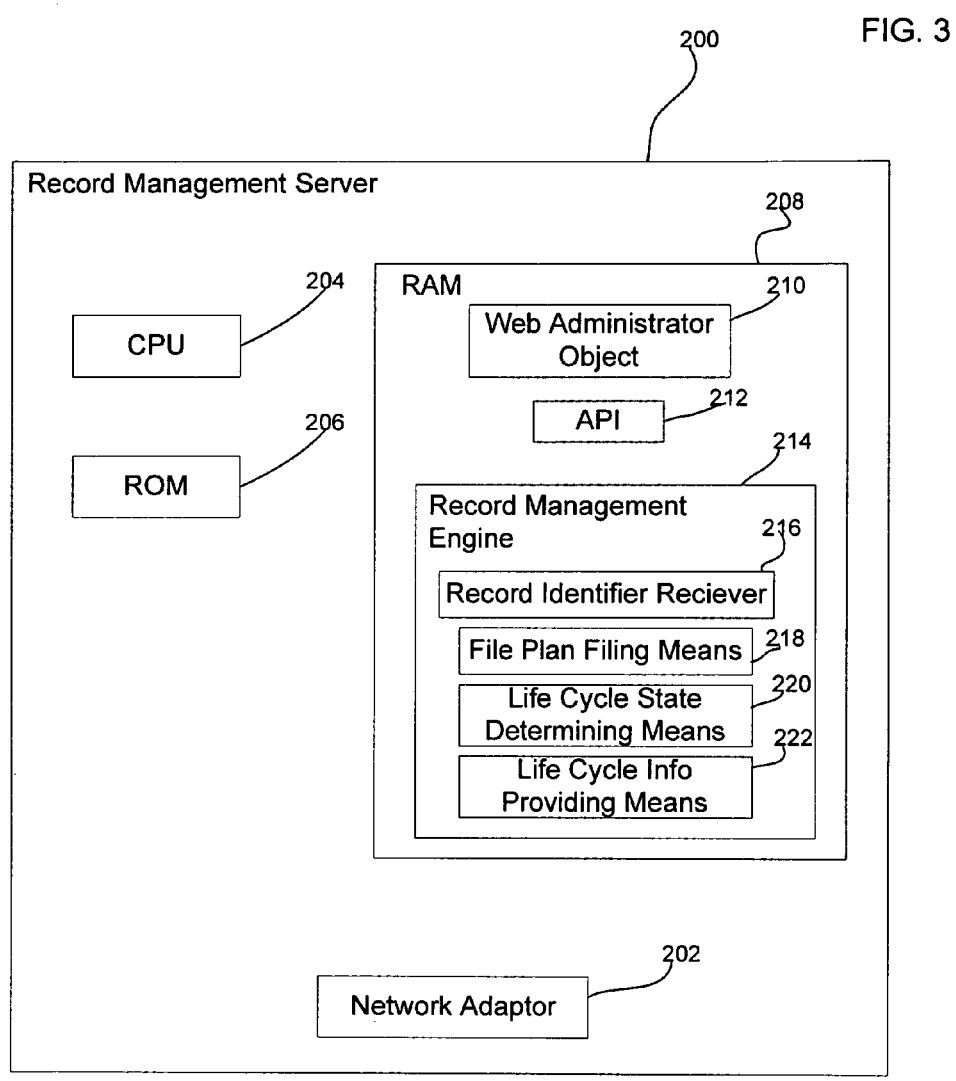
FIG. 3 is a schematic view of the record management server shown in FIG. 1.

The record management server 200 is implemented on a computer server which is preferably a Windows 2000-based server. As shown in FIG. 3, the record management server 200 comprises a network interface adapter 202 for interfacing the record management server 200 with the communications network 108, a central processing unit (CPU) 204 in communication with the network interface 202, and a non-volatile memory (ROM) 206 and a volatile memory (RAM) 208 in communication with the CPU 204. The ROM 206 is a computer readable medium, such as a magnetic or optical disc memory or an electronic memory, carrying processor instructions for the CPU 204 which establish in the RAM 208 a web administrator object 210, an applications program interface (API) 212, and a record management engine 214 for managing the life cycle of the host records managed by the host application program 114. Alternately, the web administrator object 210, the API 212 and the record management engine 214 may be implemented on separate servers to provide load balancing.

The web administrator object 210 is an Internet browser-based program that provides the administrative users of computer terminals 102 with a simplified interface to the API 212, thereby allowing the administrative users to develop and manage a corporate retention policy for the records managed by the host server 104. Preferably, the web administrator object 210 is implemented using IIS 5.0 and Active Server Pages (ASP) 3.0.

The API 212 provides the computer terminals 102 with access to the record management engine 214, and passes data to and from client applications (implemented on the computer terminals 102) using XML. Preferably, the API 212 is implemented using COM objects hosted in COM+ applications, and provides a COM interface to the web administrator object 210 and to the host application program 114. In addition, preferably the API 212 is embedded with the host application program 114, for example via a COM or Simple Object Access Protocol (SOAP) interface 116 implemented in the host application program 114, so as to allow the record management engine 214 to be accessed without requiring significant reconfiguration to the host application program 114.

The record management engine 214 manages the life cycle transitioning of the records managed by the host application program 114. The record management engine 214 is in communication with the file plan database 110, and is exposed to the host application 114 via the API 212, and to the computer terminals 102 via the combination of the web administrator object 210 and the API 212. Preferably, the record management engine 214 encapsulates all SQL DBMS access through a COM interface, and is implemented as a COM+ application that supports both Oracle and SQL Server. The COM+ application is configured to perform the following administrative functions (using the web administrator object 210):

File plan design:
    defining the rules governing the organization of records managed by the host server 104.

File plan implementation:
    defining file plan objects 122 for insertion into the file plan, including specifying security rules to the objects.

Life Cycle Administration:
    defining retention rules that govern the retention of file plan objects 122.

Life Cycle Processing:
    transitioning file plan objects 122 between their life cycle states Reporting:
    generating reports on any object in the file plan Security
    defining user and group access, and user and group function authorization In addition to being configured to perform the foregoing functions, the COM+ application includes an object defining a record identifier receiver 216, an object defining a file plan filing means 218, an object defining means for determining life cycle states 220, and an object defining means for providing life cycle instructions 222. Alternately, the objects comprising the COM+ application may be implemented on separate servers to provide load balancing. Further, although the COM+ application has been described as being implemented as a software application, it should be understood that it may also be implemented in dedicated electronic hardware, or even as a combination of hardware and software.

The record identifier receiver 216 is configured to receive from the host application program 114 a record identifier which is associated with a record managed by the host application program 114. The record identifier is associated with a record which a user logged into the host application program 114 wishes to register with the record management server 200 for life cycle tracking purposes. The record identifier includes an identifier field which the host application program 114 uses to uniquely identify the record, and profile metadata which identifies classification properties (eg. "author", "subject matter" and "project code") of the record.

As discussed above, when the administrator of the record management server 200 defines attributes 124 for the file plan, the administrator may also define pick-lists (or menus) of predefined values for file plan attributes 124 to allow users to easily provide the record management server 200 with the aforementioned profile metadata. Therefore, in one implementation of the invention, the record identifier receiver 216 is configured to locate the custom profile 140 associated with the user, and to provide the user with any default attribute values and any pick-lists defined in the custom profile 140. The user selects attribute values from the pick-lists (or menus), inputs any additional attribute values into the appropriate fields of the custom profile 140, and then transmits back to the record identifier receiver 216 the required profile metadata.

Alternately, in another implementation of the invention, the host application program 114 provides the record identifier receiver 216 with a copy of the profile data which the host application program 114 associates with a record in the host server database 112, and the record identifier receiver 216 is configured to parse the received profile data for the required profile metadata. Consequently, when a user who is logged into the host application program 114 wishes to classify a record into the appropriate file plan node 120 of the record management system 100, the record identifier receiver 216 automatically extracts the required profile metadata without manual intervention.

The file plan filing means 218 is configured to file the record identifier received from the host application program 114 within the appropriate node 120 of the file plan. To do so, the file plan filing means 218 compares the profile metadata included with the record identifier against the file plan object definitions, and inserts the record identifier at the appropriate file plan node 120 in accordance with the profile metadata.

The life cycle determining means 220 is configured to determine life cycle states for selected records registered with the record management server 200. To do so, an administrator runs a query on the file plan records 118 requesting a list of file plan objects 122 eligible to move to the next phase in their life cycle or to be disposed. For each file plan object 122 matching the specified query, the life cycle determining means 220 evaluates the retention rules against their respective life cycle codes 126 to identify the file plan objects 122 whose respective retention periods have expired.

The life cycle instructions providing means 222 is configured to provide the host application program 114 with instructions requesting the application program transition identified records to new life cycle states. To do so, the life cycle instructions providing means 222 updates the respective file cycle codes for the expired file plan objects 122, thereby transitioning the file plan objects 122 to their next life cycle phase. The life cycle instructions providing means 222 also issues a command to the host application program 114 requesting that the host application program 114 transition the records associated with the remaining file plan objects 122 to their respective new life cycle phases.

Figure 4:
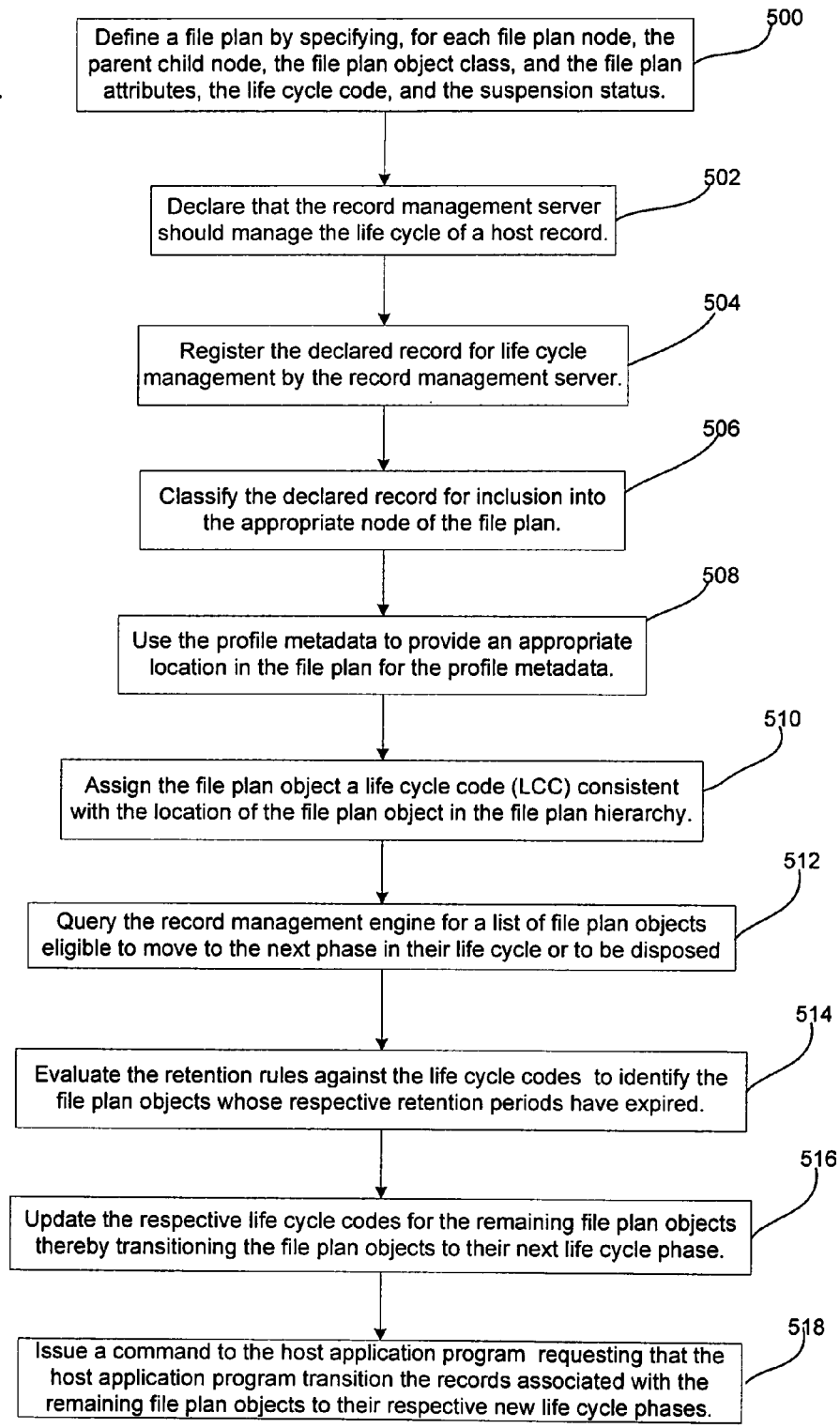
FIG. 4 is a flowchart depicting the operation of the record management system.

The life cycle management process effected by the record management system 100 will now be described in detail with reference to FIG. 4. Initially, an administrator of the record management system 100 uses one of the computer terminals 102 to log into the record management engine 214 by providing the web administrator object 210 with a UserID and Password. If the UserID and Password match a UserID and a corresponding Password included in the security table 132, the API 212 allows the administrator to use the record management engine 214.

Once the administrator has successfully logged into the record management engine 214, at step 500 the administrator defines a file plan by specifying, for each file plan node 120, the parent child node 120, the file plan object class, and the file plan attributes 124, the life cycle code 126, and the suspension status 128. The administrator also populates the security table 132 with host authentication data for the host application program(s) 114, local user authentication data for administrative users authorized to view/edit the file plan, host user authentication data for host users authorized to access the record management engine 214, and function authorization data identifying the functions each user/group is authorized to perform with the record management server 200. In addition, the administrator populates the global access table 134 and the object access table 136 with access data identifying the operations permitted for the file plan objects 122, populates the file plan view table 138 with the views permitted for the file plan, and creates any custom profile tables 140 desired. The record management engine 214 maintains the file plan, so defined, in the file plan database 110.

After the file plan has been defined, at step 502 a user who is logged into the host application program 114 declares that the record management server 200 should manage the life cycle of a host record. Typically, the user will have created and/or edited the host record, and will declare that the record management should manage the life cycle of the host record upon completion of the creation or edit phase. The user may declare the host record automatically, such as by closing the host record on the host server 104, or manually, such as by selecting an appropriate box on an electronic profile form generated by the host application program 114.

Upon completion of the record declaration step, at step 504 the host application program 114 registers the declared record for life cycle management by the record management server 200. To do so, first the host application program 114 provides the API 212 with a HostID and Password, and if the received parameters match an entry in the HostID file, the API 212 provides the host application 114 with access to the record management engine 214. The host application program 114 also provides the API 212 with the UserID of the user logged into the host server 104, and a list of all groups to which the host user belongs. The record management engine 214 uses these latter parameters to the access the Host/Alias file and the Alias/DSN file for the Database Password, and then logs in to the appropriate file plan database 110 with the Database Password.

At step 506, the host application program 114 classifies the declared record for inclusion into the appropriate node 120 of the file plan by providing the record management engine 214 with profile metadata. The user can classify the declared record either automatically or manually.

With the former approach (automatic record classification), the host application program 114 provides the record receiver 216 with profile data (eg. title, author, publication date, and subject matter) which the host application program 114 associates with the declared record, and the record receiver 216 parses the received profile data for the required profile metadata. The record identifier receiver 216 also queries the custom profile table 140 with the UserID to locate any default attribute values for inclusion with the profile metadata. This approach is advantageous since it allows the record management engine 214 to manage the life cycle phases of the declared records without the host users needing to learn a separate user interface or a new software program.

With the latter approach (manual record classification), the record receiver 216 queries the custom profile table 140 with received UserID to locate the user's custom profile, and presents to the user all attribute fields 124 which the custom profile allows the user to view. The record receiver 216 also provides the user with any default attribute values and any pick-lists defined in the custom profile. The user selects attribute values from the pick-lists, inputs any additional attribute values into the appropriate fields, and then transmits the resulting information to the record management engine 214 as the required profile metadata. Although not as user-friendly as the automatic classification approach, the manual classification approach is still advantageous since it allows the record management engine 214 to manage the life cycle phases of the declared records without the host users needing to learn a new software program.

After the declared record has been classified, at step 508 the record management engine 214 uses the profile metadata to provide an appropriate location in the file plan for the profile metadata. To do so, the file plan filing means 218 compares the received profile metadata against the file plan object definitions, and creates an appropriate file plan object 122 in the file plan database 110. The file plan filing means 218 then assigns the profile metadata to the new file plan object 122, and assigns a life cycle date to the file plan object 122. The life cycle date is typically the date the file plan object 122 is added to the file plan database 110, although an administrative user may subsequently specify an alternate date for the life cycle date.

At step 510, the file plan filing means 218 assigns the file plan object 122 a life cycle code (LCC) 126 consistent with the location of the file plan object 122 in the file plan hierarchy, and updates the security table 132 to reflect the functions authorized to be performed on the file plan object 122. As will be apparent, the functions any host user may perform on the file plan object 122 are dictated by the security level imposed on the host application program 114.

The file plan filing means 218 also notifies the host application program 114 that the declared record is now registered with the record management engine 214. Preferably, the host application program 114 assigns ownership of the record to an administration group and limits the access rights to the record to read-only for all users who are not members of the administration group. Since the record management server 200 does not retain copies of the records managed by the host application program 114, the record management server 200 does not duplicate security and access functions already implemented by the host application program 114 or require a separate storage space for the host records. In addition, since the file plan filing means 218 is implemented separately from the host application program 114, the process of filing file plan objects 122 in the file plan does not interfere with the host application program 114 by drawing on computing resources normally used by the host application program 114.

After host records have been registered with the record management engine 214, administrative users can manage the transitioning of the host records between their specified life cycle states from initial registration, throughout the respective retention periods, until final disposition. To do so, an administrative user logs into the record management engine 214 by providing the web administrator object 210 with a UserID and Password. If the UserID and Password match a UserID and a corresponding Password included in the security table 132, the API 212 allows the administrator to use the record management engine 214.

After the administrator has successfully logged into the record management engine 214, at step 512 the administrator queries the record management engine 214 for a list of file plan objects 122 eligible to move to the next phase in their life cycle or to be disposed. Typical query parameters include the branch(es) of the file plan to examine, and the reference date to use for life cycle calculations. The administrator may also specify the state of the cutoff flag, and the next life cycle phase desired for the file plan objects 122.

From the query results, the life cycle determining means 220 excludes from consideration the file plan objects 122 which do not have an assigned life cycle date, or whose respective life cycle dates are subsequent to the reference date. In addition, for each remaining file plan object 122, the life cycle determining means 220 excludes from further examination those file plan objects 122 which are suspended, and then determines their associated life cycle codes 126.

If one of the file plan objects 122 does not have an assigned life cycle code 126, the life cycle determining means 220 checks the object's parent objects, recursively, until it locates a life cycle code 126. The life cycle determining means 220 then evaluates the retention rules against the life cycle codes 126, at step 514, to identify the file plan objects 122 whose respective retention periods have expired.

After the expired file plan objects 122 have been identified, the life cycle instructions providing means 222 provides the administrator with a list of the file plan objects 122 whose respective retention periods have expired. From the list, the administrator removes or suspends any objects that it doesn't wish to be processed. The record management engine 214 then updates the respective life cycle codes 126 for the remaining file plan objects 122, at step 516, thereby transitioning the file plan objects 122 to their next life cycle phase. The life cycle instructions providing means 222 also issues a command to the host application program 114, at step 518, requesting that the host application program 114 transition the records associated with the remaining file plan objects 122 to their respective new life cycle phases.

If the new life cycle phase for any of the file plan objects 122 is "delete", the life cycle instructions providing means 222 removes from the file plan database 110 the file plan objects 122 that are to be destroyed, and issues a command to the host application program 114 requesting that the host application program 114 delete the records associated with the identified file plan objects 122. It should be noted that the host application program 114 is not required to deleted the specified records, but instead may merely update the host server database 112 to specify that the record management server 200 no longer manages the life cycle phases of the specified records.

Similarly, if the new life cycle phase for any of the file plan objects 122 is "accession", the life cycle instructions providing means 222 removes from the file plan database 110 the file plan objects 122 that are to be accessioned, and issues a command to the host application program 114 requesting that the host application program 114 move the records associated with the identified file plan objects 122 to the specified transfer directory. Subsequent to the transfer of the host record to the transfer directory, the record management engine 214 can either transfer the host records from the transfer directory to the disposal authority 130 specified for the corresponding file plan object 122, or signal the disposal authority 130 that it should transfer a record from the transfer directory to the storage site managed by the disposal authority 130.

The present invention is defined by the claimed appended hereto, with the foregoing description being illustrative of the preferred embodiments of the invention. Those of ordinary skill may envisage certain additions, deletions and/or modifications to the described embodiments which, although not explicitly suggested herein, do not depart from the scope of the invention, as defined by the appended claims.

We claim:

1. A computerized method for managing electronic records, comprising:
   receiving over a network a record identifier uniquely associated with a record managed by an application program to manage life cycle states of the record, wherein profile data is associated with the record;
   filing the received record identifier within a file plan node of a file plan in accordance with the associated profile data, wherein the file plan node has an associated retention rule;
   determining life cycle states for the managed records from the retention rules; and
   transmitting life cycle instructions over the network requesting the application program transition the managed records to the determined life cycle states.

2. The method of claim 1, wherein the application program maintains a record profile for each of the managed records, wherein the profile data associated with the record is received from the application program.

3. The method of claim 1, further comprising: providing a menu of the file plan nodes, wherein the associated profile data is determined from the menu selection.

4. The method of claim 1, wherein the file plan nodes include life cycle codes identifying the life cycle state of an associated record, and suspension status flags identifying whether the associated record should transition between different ones of the life cycle states, wherein determining the life cycle state comprises evaluating the retention rules against the life cycle codes, a reference date and a state of the status flags.

5. The method of claim 1, wherein the file plan includes a hierarchical arrangement of the file plan nodes, wherein at least one of the file plan nodes includes no life cycle code, and wherein determining the life cycle state comprises evaluating the retention rule for the at least one file plan node against the life cycle code associated with a parent one of the at least one file plan node.

6. The method of claim 1, wherein the file plan includes a non-hierarchical arrangement of the file plan nodes, wherein at least one of the file plan nodes includes no life cycle code, and wherein determining the life cycle state comprises evaluating the retention rule for the at least one file plan node against the life cycle code associated with a parent one of the at least one file plan node.

7. An electronic record management engine implemented in a computer system for facilitating life cycle management of records managed by an application program, wherein the record management engine communicates with the application program over a network, wherein the record management engine is configured to perform operations, the operations comprising:
receiving over the network a record identifier associated with a record managed by the application program, wherein profile data is associated with the record;
filing the received record identifier within a file plan node of a file plan in accordance with the associated profile data, wherein the file plan node has an associated life cycle rule;
determining life cycle states for the managed records from the life cycle rules; and
transmitting life cycle instructions over the network requesting the application program transition the managed records to the determined life cycle states.

8. The record management engine of claim 7, wherein the application program maintains a record profile for each of the managed records, wherein the profile data associated with the record is received from the application program.

9. The record management engine of claim 7, wherein the operations for comprise:
providing a menu of the file plan nodes, wherein the associated profile data is determined from the menu selection.

10. The record management engine of claim 7, wherein the file plan nodes include life cycle codes identifying the life cycle state of an associated record, and suspension status flags identifying whether the associated record should transition between different ones of the life cycle states, wherein determining the life cycle states comprises evaluating the retention rules against the life cycle codes, a reference date and a state of the status flags.

11. The record management engine of claim 10, wherein the file plan includes a hierarchical arrangement of the file plan nodes, wherein at least one of the file plan nodes includes no life cycle code, and wherein the retention rules are evaluated by evaluating the retention rule for the at least one file plan node against the life cycle code associated with a parent one of the at least one file plan node.

12. The record management engine of claim 10, wherein the file plan includes a non-hierarchical arrangement of the file plan nodes, wherein at least one of the file plan nodes includes no life cycle code, and wherein the retention rules are evaluated by evaluating the retention rule for the at least one file plan node against the life cycle code associated with a parent one of the at least one file plan node.

13. A records manager implemented in a computer system for managing life cycle phases of records managed by a host application program, the record manager being in communication with the host application program over a network and comprising:
a file plan database including at least one file plan object, each said file plan object having a life cycle rule;
a record management engine configured to perform operations, the operations comprising:
filing record identifiers within the file plan objects in accordance with profile data received over the network and being associated with the records; and
tracking changes in life cycle phases for the records from the life cycle rules; and
an applications program interface in communication with the record management engine, the applications program interface being configured to transmit to the host application program over the network indications of the changes in the life cycle phases.

14. The records manager according to claim 13, wherein the file plan database comprises for each file plan object a record type field for the associated record, and an attribute field defining the profile data.

15. The records manager according to claim 13, wherein the file plan database includes at least one file plan view table defining a subset of the file plan objects, and a relationship between the file plan objects of the file plan object subset.

16. The records manager according to claim 13, wherein the file plan database includes at least one custom profile table identifying a subset of the attributes for at least one of the file plan objects, and at least one user of the application program allowed to view the attribute subset.

17. The records manager according to claim 13, wherein the file plan database includes an access control list defining at least one access operation for at least one of the file plan objects, and at least one user of the application program allowed to perform the access operation.

18. The records manager according to claim 13, wherein the file plan objects each include a life cycle code identifying the life cycle phase of the associated record, and a suspension status flag identifying whether the associated record should transition between the life cycle phases, and wherein the record management engine tracks changes in the life cycle phases by evaluating the retention rules against the life cycle codes, a reference date and a state of the status flag.

19. The records manager according to claim 18, wherein each file plan node is configured to include at least two of the suspension status flags, and wherein the record management engine to prevent, for each record, the transitioning between the life cycle phases until all of the associated suspension status flags are removed.

20. The records manager according to claim 13, wherein the file plan includes a hierarchical arrangement of the file plan objects, at least one of the file plan objects includes no life cycle code, and wherein the record management engine tracks changes in the life cycle phases by evaluating the retention rule for the at least one file plan object against the life cycle code associated with a parent one of the at least one file plan object.

21. The records manager according to claim 13, wherein the file plan includes a non-hierarchical arrangement of the file plan objects, at least one of the file plan objects includes no life cycle code, and wherein the record management engine tracks changes in the life cycle phases by evaluating the retention rule for the at least one file plan object against the life cycle code associated with a parent one of the at least one file plan object.

22. A computer-based records management engine for managing life cycle phases of records managed by a host application program, the record manager being configured to communicate with the host application program over a network and to communicate with a file plan database, comprising:
 a database interface for accessing the file plan database, the file plan database including at least one file plan node, each said file plan node including a life cycle retention rule governing life cycle phase changes of an object associated with the file plan node;
 filing code in communication with the database interface for filing record identifiers within respective ones of the file plan nodes in accordance with respective profiles for the records, the profiles being received over the network;
 determining code in communication with the database interface for tracking changes in the life cycle phases for the records from the life cycle rules; and
 an applications program interface in communication with the filing code and the determining code and being configured to transmit to the host application program over the network indications of the changes in the life cycle phases.

23. The management engine of claim 22, wherein the file plan nodes each include a life cycle code identifying the life cycle phase of an associated record, and a suspension status flag identifying whether the associated record should transition between the life cycle phases, and wherein the determining code is configured to evaluate the retention rules against the life cycle codes, a reference date and a state of the status flag.

24. The management engine of claim 23, wherein each file plan node is configured to include at least two of the suspension status flags, and wherein the determining code is configured for each said record to prevent the transitioning between the life cycle phases until all of the associated suspension status flags are removed.

25. The management engine of claim 22, wherein the file plan includes a hierarchical arrangement of the file plan nodes, at least one of the file plan nodes includes no life cycle code, and wherein the determining code is configured to evaluate the retention rule for the at least one file plan node against the life cycle code associated with a parent one of the at least one file plan node.

26. The management engine of claim 22, wherein the file plan includes a non-hierarchical arrangement of the file plan nodes, at least one of the file plan nodes includes no life cycle code, and wherein the determining code is configured to evaluate the retention rule for the at least one file plan node against the life cycle code associated with a parent one of the at least one file plan node.

27. A computer-based management engine for managing life cycle phases of electronic records managed by a host application program, the management engine being configured to communicate with the host application program over a network and to communicate with a file plan database, comprising:
 an interface for accessing the file plan database, the file plan database including at least one file plan node, each said file plan node including a life cycle retention rule governing life cycle phase changes of an object associated with the file plan node;
 filing code in communication with the interface for filing record identifiers within respective ones of the file plan nodes in accordance with respective profiles of the electronic records, the filing code being configured to receive the profiles over the network from the application program; and
 determining code in communication with the interface for transitioning the managed records between different ones of the life cycle phases from the respective life cycle rules.

28. The management engine of claim 27, wherein the file plan nodes each include a life cycle code identifying the life cycle phase of an associated record, and a suspension status flag identifying whether the associated record should transition between the life cycle phases, and wherein the determining code is configured to evaluate the retention rules against the life cycle codes, a reference date and a state of the status flag.

29. The management engine of claim 28, wherein each file plan node is configured to include at least two of the suspension status flags, and wherein the determining code is configured for each said record to prevent the transitioning between the life cycle phases until all of the associated suspension status flags are removed.

30. The management engine of claim 27, wherein the file plan includes a hierarchical arrangement of the file plan nodes, at least one of the file plan nodes includes no life cycle code, and wherein the determining code is configured to evaluate the retention rule for the at least one file plan node against the life cycle code associated with a parent one of the at least one file plan node.

31. The management engine of claim 27, wherein the file plan includes a non-hierarchical arrangement of the file plan nodes, at least one of the file plan nodes includes no life cycle code, and wherein the determining means is configured to evaluate the retention rule for the at least one file plan node against the life cycle code associated with a parent one of the at least one file plan node.

32. A computer-readable medium carrying processing instructions for a computer in communication with an application program over a network, the processing instructions causing the computer to perform operations comprising:
 receiving over the network a record identifier uniquely associated with a record managed by the application program, the record identifier including profile data for the associated record;
 filing the received record identifier within a file plan node of a file plan in accordance with the associated profile data, each said file plan node having an associated life cycle rule; determining life cycle states for the managed records from the life cycle rules; and
 providing life cycle instructions over the network to the application program requesting the application program transition the managed records to the respective life cycle states.

33. A computer-readable medium carrying processing instructions for a computer in communication with an application program over a network, the processing instructions defining in the computer:

receiving code for receiving over the network a record identifier associated with a record managed by the application program, the record identifier including profile data for the associated record;

filing code for filing the received record identifier within a file plan node of a file plan in accordance with the associated profile data, each said file plan node having an associated life cycle rule;

determining code for determining life cycle states for the managed records from the life cycle rules; and providing code for providing life cycle instructions over the network to the application program requesting the application program transition the managed records to the respective life cycle states.

34. A computer-readable medium carrying processing instructions for a computer in communication with an application program over a network and in communication with a file plan database, the processing instructions defining in the computer:

a database interface for accessing the file plan database, the file plan database including at least one file plan node, each said file plan node including a life cycle retention rule governing life cycle phase changes of an object associated with the file plan node;

filing code in communication with the database interface for filing record identifiers within respective ones of the file plan nodes in accordance with respective profiles for the records, the profiles being received over the network;

determining code in communication with the database interface for tracking changes in the life cycle phases for the records from the life cycle rules; and an applications program interface in communication with the filing means and the determining code and being configured to transmit to the application program over the network indications of the changes in the life cycle phases.

35. A computer-readable medium carrying processing instructions for a computer in communication with an application program over a network and in communication with a file plan database, the processing instructions defining in the computer:

an interface for accessing the file plan database, the file plan database including at least one file plan node, each said file plan node including a life cycle retention rule governing life cycle phase changes of an object associated with the file plan node;

filing code in communication with the interface for filing record identifiers within respective ones of the file plan nodes in accordance with respective profiles of electronic records, the filing code being configured to receive the profiles over the network from the application program; and determining code in communication with the interface for transitioning the managed records between different ones of the life cycle phases from the respective life cycle rules.

36. A computerized method for managing electronic records, comprising:

defining a file plan within a file plan database, the file plan specifying at least one file plan node, each said file plan node including a life cycle retention rule;

receiving over a network a record identifier uniquely associated with a record managed by an application program to manage life cycle states of the record, wherein profile data is associated with the record;

filing the received record identifier within the at least one file plan node of the file plan database in accordance with the associated profile data;

determining life cycle states for the managed records from the retention rule; and transmitting life cycle instructions over the network requesting the application program transition the managed records to the determined life cycle states.

37. The method of claim 36, wherein the application program maintains a record profile for each of the managed records, wherein the profile data associated with the record is received from the application program.

38. The method of claim 36, further comprising:
providing a menu of the file plan nodes, wherein the associated profile data is determined from the menu selection.

39. The method of claim 36, wherein the file plan nodes include life cycle codes identifying the life cycle state of an associated record, and suspension status flags identifying whether the associated record should transition between different ones of the life cycle states, and wherein determining the life cycle state comprises evaluating the retention rules against the life cycle codes, a reference date and a state of the status flags.

40. The method of claim 36, wherein the file plan includes a hierarchical arrangement of the file plan nodes, at least one of the file plan nodes includes no life cycle code, and wherein determining the life cycle state comprises evaluating the retention rule for the at least one file plan node against the life cycle code associated with a parent one of the at least one file plan node.

41. The method of claim 36, wherein the file plan includes a non-hierarchical arrangement of the file plan nodes, at least one of the file plan nodes includes no life cycle code, and wherein determining the life cycle state comprises evaluating the retention rule for the at least one file plan node against the life cycle code associated with a parent one of the at least one file plan node.

42. A computer-readable medium carrying processing instructions for a computer in communication with an application program over a network and in communication with a file plan database, wherein the processing instructions cause the computer to perform operations comprising:

defining a file plan within the file plan database, the file plan specifying at least one file plan node, each said file plan node including a life cycle retention rule;

receiving over the network a record identifier uniquely associated with a record managed by the application program, the record identifier including profile data for the associated record;

filing the received record identifier within the at least one file plan node of the file plan database in accordance with the associated profile data;

determining life cycle states for the managed records from the life cycle retention rules; and providing life cycle instructions over the network to the application program requesting the application program transition the managed records to the respective life cycle states.

43. The processing instructions of claim 42, wherein the file plan nodes include life cycle codes identifying the life cycle state of an associated record, and suspension status flags identifying whether the associated record should transition between different ones of the life cycle states, wherein determining the life cycle state comprises evaluating the retention rules against the life cycle codes, a reference date and a state of the status flags.

44. The processing instructions of claim 42, wherein the file plan includes a hierarchical arrangement of the file plan nodes, at least one of the file plan nodes includes no life cycle code, and wherein determining the life cycle state comprises evaluating the retention rule for the at least one file plan node against the life cycle code associated with a parent one of the at least one file plan node.

45. The processing instructions of claim 42, wherein the file plan includes a non-hierarchical arrangement of the file plan nodes, at least one of the file plan nodes includes no life cycle code, and wherein determining the life cycle state comprises evaluating the retention rule for the at least one file plan node against the life cycle code associated with a parent one of the at least one file plan node.

46. A computer-based management engine for managing life cycle phases of electronic records managed by a host application program, the management engine being configured to communicate with the host application program over a network, wherein the management engine performs operations, wherein the operations comprise:
   defining a file plan within a file plan database, the file plan including at least one file plan node, each said file plan node including a life cycle retention rule governing life cycle phase changes of an object associated with the file plan node;
   communicating with the file plan database for filing record identifiers within respective ones of the file plan nodes in accordance with respective profiles of the electronic records, wherein the profiles are received over the network from the application program; and
   communicating with the file plan database to determine from the life cycle rules transitions for the managed records between different life cycle phases.

47. The management engine of claim 46, wherein the file plan nodes each include a life cycle code identifying the life cycle phase of an associated record, and a suspension status flag identifying whether the associated record should transition between the life cycle phases, wherein the transitions are determined by evaluating the retention rules against the life cycle codes, a reference date and a state of the status flag.

48. The management engine according to claim 47, wherein each file plan node is configured to include at least two of the suspension status flags, further comprising:
   preventing the transitioning between the life cycle phases until all of the associated suspension status flags are removed.

49. The management engine of claim 46, wherein the file plan includes a hierarchical arrangement of the file plan nodes, at least one of the file plan nodes includes no life cycle code, and wherein the transitions are determined by evaluating retention rule for the at least one file plan node against the life cycle code associated with a parent one of the at least one file plan node.

50. The management engine of claim 46, wherein the file plan includes a non-hierarchical arrangement of the file plan nodes, at least one of the file plan nodes includes no life cycle code, and wherein the transitions are determined by evaluating the retention rule for the at least one file plan node against the life cycle code associated with a parent one of the at least one file plan node.

51. A computer-readable medium carrying processing instructions for a computer in communication with an application program over a network and in communication with a file plan database, wherein the processing instructions cause the computer to perform operations, the operations comprising:
   defining a file plan within the file plan database, the file plan including at least one file plan node, each said file plan node including a life cycle retention rule governing life cycle phase changes of an object associated with the file plan node;
   communicating with the file plan database to file record identifiers within respective ones of the file plan nodes in accordance with respective profiles of electronic records, wherein the profiles are received over the network from the application program; and
   communicating with the file plan database for transitioning the managed records between different ones of the life cycle phases from the respective life cycle rules.

52. A computerized method of defining a file plan in a file plan database, comprising:
   defining at least one view of a file plan in the file plan database, wherein the file plan is used to categorize electronic records;
   defining file plan components of the file plan;
   defining at least one attribute for at least one of the file plan components; and
   defining at least one relationship between components of the file plan.

53. A computer-readable medium carrying processing instructions for a computer, the processing instructions causing the computer to perform operations, the operations comprising:
   defining at least one view of a file plan in a file plan database, wherein the file plan is used to categorize electronic records;
   defining file plan components of the file plan;
   defining at least one attribute for at least one of the file plan components; and
   defining at least one relationship between components of the file plan.

54. A computer-readable medium carrying processing instructions for a computer, the processing instructions defining in the computer:
   file plan view defining code for defining at least one view of a file plan in a file plan database, wherein the file plan is used to categorize electronic records;
   a file plan component defining code for defining at least one file plan component of the file plan;
   a file plan component attribute defining code for defining at least one attribute of the at least one file plan component; and
   a file plan component relationship defining code for defining the relationship between components of the file plan.

* * * * *